(12) United States Patent
Lehtonen

(10) Patent No.: US 7,716,983 B2
(45) Date of Patent: May 18, 2010

(54) CAPACITIVE ACCELERATION SENSOR

(75) Inventor: Tuomo Lehtonen, Helsinki (FI)

(73) Assignee: VTI Technologies Oy, Vantaa (FI)

( * ) Notice: Subject to any disclaimer, the term of this patent is extended or adjusted under 35 U.S.C. 154(b) by 787 days.

(21) Appl. No.: 10/774,695

(22) Filed: Feb. 10, 2004

(65) Prior Publication Data

US 2004/0221650 A1 Nov. 11, 2004

(30) Foreign Application Priority Data

Feb. 11, 2003 (FI) ................................. 20030206

(51) Int. Cl.
*G01P 15/125* (2006.01)
(52) U.S. Cl. .................................. 73/514.32
(58) Field of Classification Search ............. 73/514.32, 73/514.36, 514.37, 514.38, 514.02, 514.01, 73/514.29; 361/280, 283.1
See application file for complete search history.

(56) References Cited

U.S. PATENT DOCUMENTS

| | | | |
|---|---|---|---|
| 4,483,194 A | 11/1984 | Rudolf | |
| 4,750,364 A | 6/1988 | Kawamura et al. | |
| 5,065,628 A | 11/1991 | Benecke | |
| 5,349,858 A * | 9/1994 | Yagi et al. ................. | 73/514.02 |
| 5,417,312 A | 5/1995 | Tsuchitani et al. | |
| 5,831,164 A | 11/1998 | Reddi et al. | |
| 5,905,203 A * | 5/1999 | Flach et al. ............... | 73/514.32 |
| 5,974,880 A | 11/1999 | Yamaguchi et al. | |
| 6,000,287 A | 12/1999 | Menzel | |
| 6,765,160 B1 * | 7/2004 | Robinson .............. | 200/61.45 R |

FOREIGN PATENT DOCUMENTS

| | | |
|---|---|---|
| EP | 0 497 289 A1 | 8/1992 |
| EP | 0 691 542 A1 | 1/1996 |
| JP | 5-142251 | 6/1993 |
| WO | 03/010545 | 2/2003 |

OTHER PUBLICATIONS

Benson, Harris, University Physics. Hoboken, New Jersey, USA: John Wiley & Sons, Inc., 1996, ISBN 0-471-00869-0., s. 515 Kuvio 26.5, one page.

* cited by examiner

*Primary Examiner*—Helen C. Kwok
(74) *Attorney, Agent, or Firm*—Squire, Sanders & Dempsey, LLP

(57) ABSTRACT

The invention relates to measuring devices used in the measuring of acceleration and, more specifically, to capacitive acceleration sensors. The capacitive acceleration sensor according to the present invention contains a movable electrode (5) supported at an axis of rotation (7). The capacitance change in the pair of electrodes of the acceleration sensor, according to the present invention, is enhanced. The acceleration sensor structure, according to the present invention, enables improving the capacitance sensitivity of the pair of electrodes based on rotational motion and measuring acceleration with good performance in capacitive acceleration sensor designs.

3 Claims, 11 Drawing Sheets

CAPACITIVE ACCELERATION SENSOR

FIELD OF THE INVENTION

The present invention relates to measuring devices used in the measuring of acceleration, and more specifically to capacitive acceleration sensors. An object of the invention is to provide an improved sensor structure, which enables reliable and efficient measuring of acceleration, in particular in small capacitive acceleration sensor designs.

BACKGROUND OF THE INVENTION

Measuring based on a capacitive acceleration sensor has proved to have a simple principle and to provide a reliable method in the measuring of acceleration. The capacitive measuring is based on a change in the gap between two surfaces of a pair of electrodes of the sensor. The capacitance between the surfaces, i.e. the capacity for storing electric charge, depends on the area of the surfaces and on the distance between the surfaces. Capacitive measuring can be used already at rather low measuring ranges of acceleration.

The prior art is described below with exemplifying reference to the accompanying figures, of which:

FIG. 1 shows a perspective view of the structure of a pair of electrodes of an acceleration sensor according to prior art, and FIG. 2 shows a side view of the functional structure of a translatory motion based pair of electrodes of the acceleration sensor according to prior art.

FIG. 1 shows a perspective view of the structure of a pair of electrodes of an acceleration sensor according to prior art. The pair of electrodes of the acceleration sensor according to prior art comprises a movable electrode 1, which moves according to the acceleration, and a stationary electrode 2. The movable electrode 1 is that part 1 of the acceleration sensor, which is responsive to the acceleration, and which part, in consequence of the acceleration, moves in relation to the stationary electrode 2. The movable electrode 1 and the stationary electrode 2 constitute a pair of electrodes converting acceleration into a quantity that can be measured electrically, i.e. capacitance. In the Figure, the movable electrode 1 of the acceleration sensor is supported at points 3 and 4. Generally, on the opposite side of the movable electrode 1, the acceleration sensor of prior art also comprises a second pair of electrodes, which, for clarity reasons, is not shown in the Figure.

The acceleration sensor can be implemented based on either a translatory motion or a rotational motion of the movable electrode of the pair of electrodes.

FIG. 2 shows a side view of the functional structure of a translatory motion based pair of electrodes of the acceleration sensor, according to prior art. The pair of electrodes of the acceleration sensor, according to prior art, comprises a movable electrode 1 and a stationary plate portion 2.

The support point of the movable electrode 1 of the acceleration sensor is indicated by point 4. As the movable electrode 1 of the acceleration sensor is in an upper position, a capacitance is formed between the bottom surface of the movable electrode 1 and the top surface of the plate portion 2. The magnitude of the capacitance depends on the area of the surfaces 1, 2 and the distance between the surfaces 1, 2. When the movable electrode 1 of the acceleration sensor moves to a lower position, the capacitance between the surfaces 1, 2 increases considerably, as the distance between the surfaces 1, 2 decreases.

The implementation of the acceleration sensor according to the present invention using several pairs of electrodes is described in more detail in the Applicant's co-pending international patent application.

SUMMARY OF THE INVENTION

The object of the present invention is to provide such an improved sensor structure, which makes it possible to improve the capacitance sensitivity of a pair of electrodes based on rotational motion, and to measure acceleration with good performance in capacitive acceleration sensor designs.

According to the present invention, there is provided a capacitive acceleration sensor, comprising at least one pair of electrodes, such that each pair of electrodes comprises a movable electrode responsive to the acceleration and at least one stationary plate portion, such that each pair of electrodes further comprises an axis of rotation essentially forming a common axis, such that the movable electrode of the acceleration sensor is rigidly supported at the axis of rotation, such that the movable electrode is free to turn in a rotational motion about the axis of rotation, and that the capacitance change between the movable electrode in rotational motion and the plate portion is enhanced by the electrodes.

Preferably, the change in capacitance between the movable electrode in rotational motion and the plate portion has been enhanced by the shape of the electrodes.

Preferably, the pair of electrodes has been shaped by means of the movable electrode such, that a significant portion of the area of the pair of electrodes is located as far away as possible from the axis of rotation of the movable electrode. Alternatively, the pair of electrodes has been shaped by means of the at least one stationary plate portion such, that a significant portion of the area of the pair of electrodes is located as far away as possible from the axis of rotation of the movable electrode. Preferably, the pair of electrodes has been shaped by means of the movable electrode and the at least one stationary plate portion such, that a significant portion of the area of the pair of electrodes is located as far away as possible from the axis of rotation of the movable electrode.

Preferably, the movable electrode has essentially two support points, springs associated with these points providing a degree of rotational freedom to the movable electrode about the axis of rotation. Preferably, the movable electrode is supported close to its edges by torsion springs. Alternatively, the movable electrode is supported by torsion springs at separate projections. Alternatively, the movable electrode is supported at its interior by torsion springs. Alternatively, the movable electrode is supported by springs with bending and rotational degrees of freedom of equal order of magnitude. Alternatively, the movable electrode has at least three support points, two of which are essential support points.

Preferably, the pair of electrodes is shaped in a triangular shape. Alternatively, the pair of electrodes is shaped in a drop shape. Alternatively, the pair of electrodes is shaped in a hammer shape. Preferably, the change in the capacitance between the movable electrode in rotational motion and the plate portion has been enhanced by means of electrode coating.

Preferably, the change in the capacitance between the movable electrode in rotational motion and the plate portion is enhanced by a greater distance between the electrons of the electrodes. Preferably, the acceleration sensor structure comprises a second stationary electrode on the opposite side of each movable electrode.

BRIEF DESCRIPTION OF THE DRAWINGS

The present invention, and preferable methods for its implementation, are described in detail below, with exemplifying reference to the accompanying drawings, of which.

DETAILED DESCRIPTION OF THE INVENTION

Figure 1:
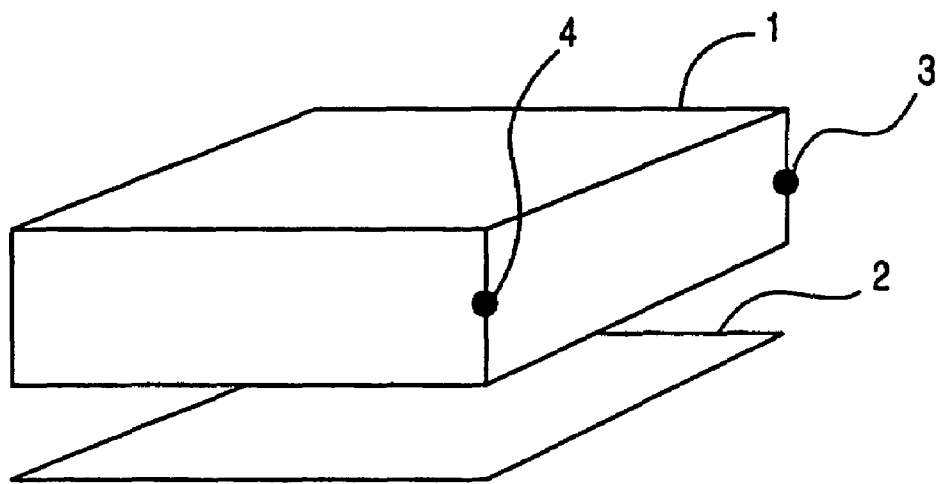
FIG. 1 shows a perspective view of the structure of a pair of electrodes of an acceleration sensor according to prior art.
Figure 2:
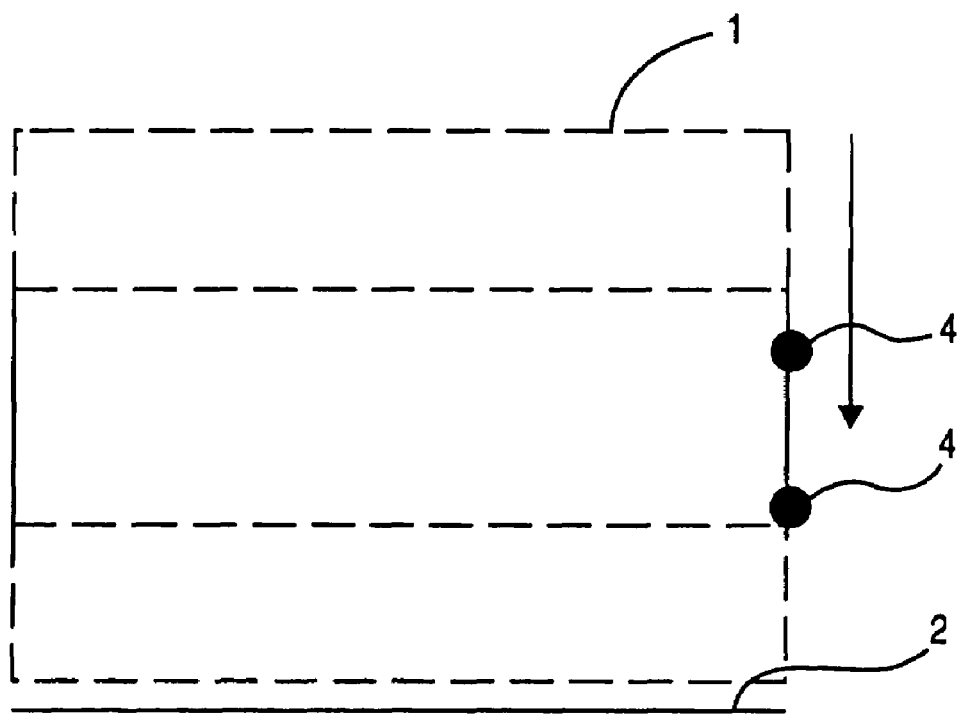
FIG. 2 shows a side view of the functional structure of a pair of electrodes, based on translatory motion, of an acceleration sensor according to prior art.
Figure 3:
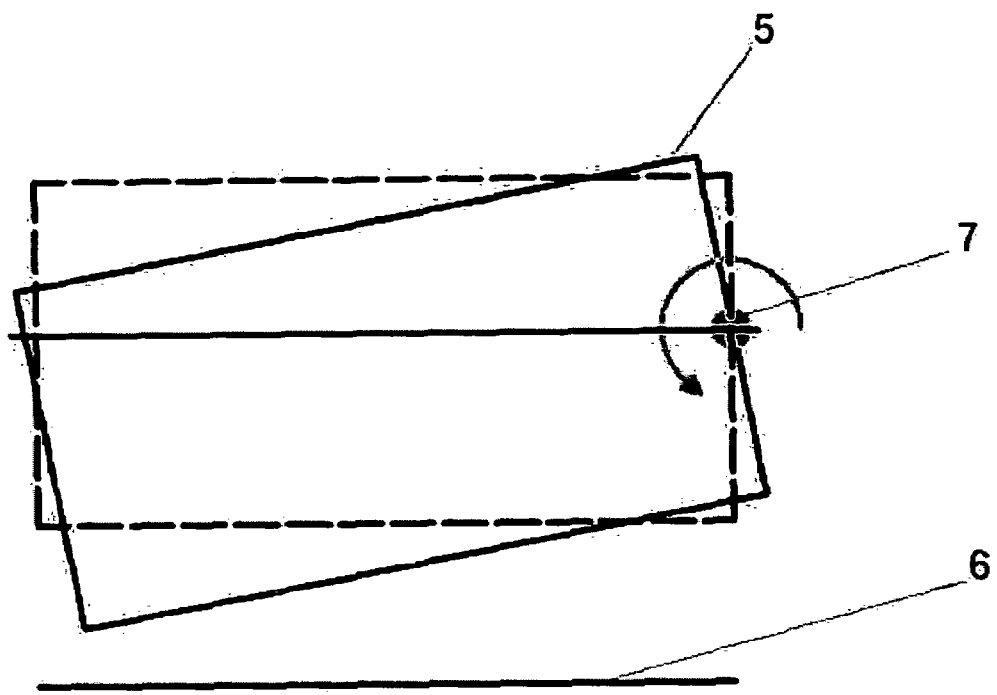
FIG. 3 shows a side view of the functional structure of a pair of electrodes of an acceleration sensor according to the present invention.

FIG. 3 shows a side view of the functional structure of a pair of electrodes of an acceleration sensor according to the present invention. A pair of electrodes of the acceleration sensor, according to the present invention, comprises a movable electrode 5, a stationary electrode 6 and an axis of rotation 7.

The movable electrode 5 of the acceleration sensor is rigidly supported at the axis of rotation 7 such, that the movable electrode 5 is free to rotate in a rotational motion about the axis of rotation 7. The movable electrode 5 in rotational motion constitutes the part of the acceleration sensor being responsive to acceleration, which part as a consequence of the acceleration performs rotational motion about the axis of rotation 7.

When, before the rotational motion, the movable electrode 5 of the acceleration sensor is in an upper position, a capacitance is formed between the bottom surface of the movable electrode 5 and the top surface of the stationary electrode 6. The magnitude of the capacitance depends on the area of the surfaces 5, 6 and the distance between the surfaces 5, 6. When the movable electrode 5 rotates after the rotational motion to a lower position, the capacitance between the surfaces 5, 6 increases as the distance between the surfaces 5, 6 decreases.

The capacitance between the surfaces 5, 6 in the pair of electrodes of the acceleration sensor, according to the present invention, is unevenly distributed over the surfaces 5 and 6, since the distance between the surfaces 5, 6 varies. The acceleration sensor according to the present invention may also comprise a second pair of electrodes on the opposite side of the movable electrode 5.

In the acceleration sensor according to the present invention, the change in capacitance of the movable electrode in rotational motion is enhanced by means of the shape of the pair of electrodes in comparison with a pair of electrodes of rectangular shape. The enhancement of capacitance change is based on the unevenness in electrode distance caused by the rotational motion.

The position of the tip of the movable electrode in rotational motion is the factor limiting the maximum value of the angle of rotation. Generally, there is a buffer structure on top of the stationary electrode, the pair of electrodes achieving its capacitance maximum, as the movable electrode hits that structure. The most sensitive area regarding the capacitance change is also at the tip of the movable electrode, since that is where the distance of the pair of electrodes changes the most.

The maximum value of the angle of rotation depends on the maximum distance of the movable electrode from the axis of rotation, whereas the magnitude of the capacitance formed at the tip of the electrode depends on the width of the pair of electrodes. The capacitance of an unloaded pair of electrodes depends only on the surface of the pair of electrodes.

In the present invention, the pair of electrodes is shaped either by means of the movable electrode, the stationary electrode or both electrodes such, that a significant portion of the area of the pair of electrodes is as far away as possible from the axis of rotational motion at the stationary electrode. Shapes of pairs of electrodes, according to the present invention, are e.g. triangle-like, drop-like or hammer-like pairs of electrodes. With the structure according to the present invention a major part of the capacitance generated by the pair of electrodes is generated in the area, where the distance of the pair of electrodes changes greatly.

Figure 4:
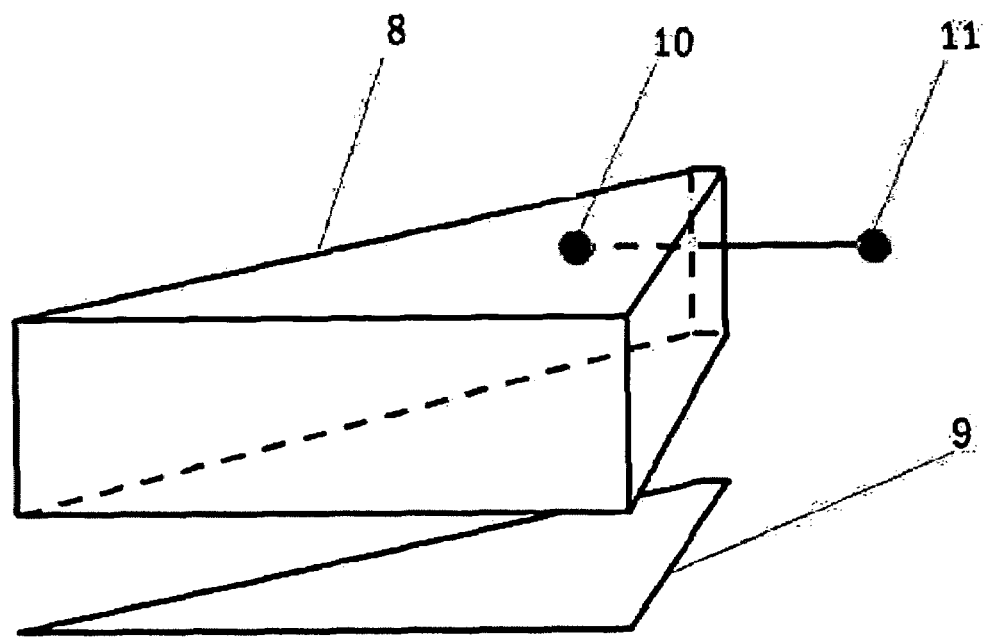
FIG. 4 shows a perspective view of the structure of a pair of electrodes of an acceleration sensor according to the present invention.

FIG. 4 shows a perspective view of the structure of a pair of electrodes of an acceleration sensor according to the present invention. The pair of electrodes of the acceleration sensor, according to the present invention, comprises a designed movable electrode 8, which moves according to the acceleration, and a designed stationary electrode 9. The movable electrode 8 constitutes the part 8 of the acceleration sensor, which part is responsive to acceleration, and which part, in consequence of the acceleration, moves in relation to the plate portion 9. The movable electrode 8 and the stationary electrode 9 form a pair of electrodes converting acceleration into an electrically measurable quantity, i.e. capacitance. In the Figure, the movable electrode 8 of the acceleration sensor is supported at points 10 and 11 of the axis of rotation.

Alternative shapes for the pairs of electrodes are, for example, triangle-like, drop-like or hammer-like pairs of electrodes. With a structure like this, the major portion of the capacitance generated by the pair of electrodes is generated at the area, where the distance of the pair of electrodes changes greatly.

Figure 5:
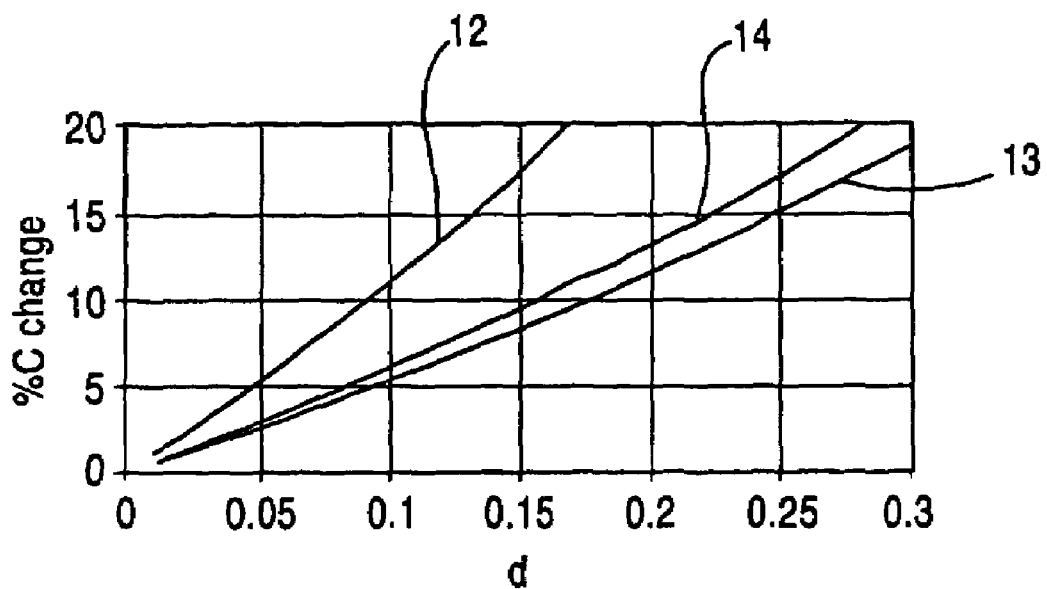
FIG. 5 shows the change, expressed in percentages, in the capacitance of a pair of electrodes of an acceleration sensor according to the present invention, as the distance between the surfaces of the pair of electrodes varies.

FIG. 5 shows the change, expressed in percentages, in the capacitance of a pair of electrodes of an acceleration sensor according to the present invention, as the distance between the surfaces of the pair of electrodes varies. The horizontal axis shows the distance (d) between the surfaces of the pair of electrodes. Correspondingly, the vertical axis shows the change, expressed in percentages, in the capacitance of the pair of electrodes (% C change). The curve 12 depicts the change, expressed in percentages, in the capacitance of an ordinary pair of electrodes with surfaces of rectangular shape moving in translatory motion, as the distance between the surfaces of the pair of electrodes varies. The curve 13, respectively, depicts the change, expressed in percentages, in the capacitance of a pair of electrodes with surfaces of rectangular shape moving in rotational motion, as the distance between the surfaces of the pair of electrodes varies.

Thus, it can be seen, that the change in capacitance for the pair of electrodes moving in a rotational motion used in the measuring is not as large as for the ordinary pair of electrodes with surfaces of rectangular shape moving in translatory motion. This change sensitivity needed for the measuring can be compensated by shaping the pair of electrodes. The curve 14 depicts the change, expressed in percentages, in the capacitance of a pair of electrodes with surfaces of triangular shape in rotational motion, as the distance between the surfaces of the pair of electrodes varies.

The movable electrode of the pair of electrodes of the acceleration sensor according to the present invention has essentially two points of support with related springs providing a degree of freedom of rotation for the movable electrode about a straight line drawn through the points of support.

The movable electrodes can be limited to those having a direction of sensitivity to acceleration, which is not parallel to the electrode plane. Here, the electrode plane is understood to mean a plane of the electrode formed by the least squares method. Thus, the center of gravity of the movable electrode projected onto a plane parallel to the electrode plane of the electrode, in a direction perpendicular to the electrode plane of the movable electrode, which plane parallel to the electrode plane of the movable electrode passes through the points of support of the movable electrode, said projected movable electrode must not lie on the straight line drawn between the points of support of the movable electrode.

Figure 6:
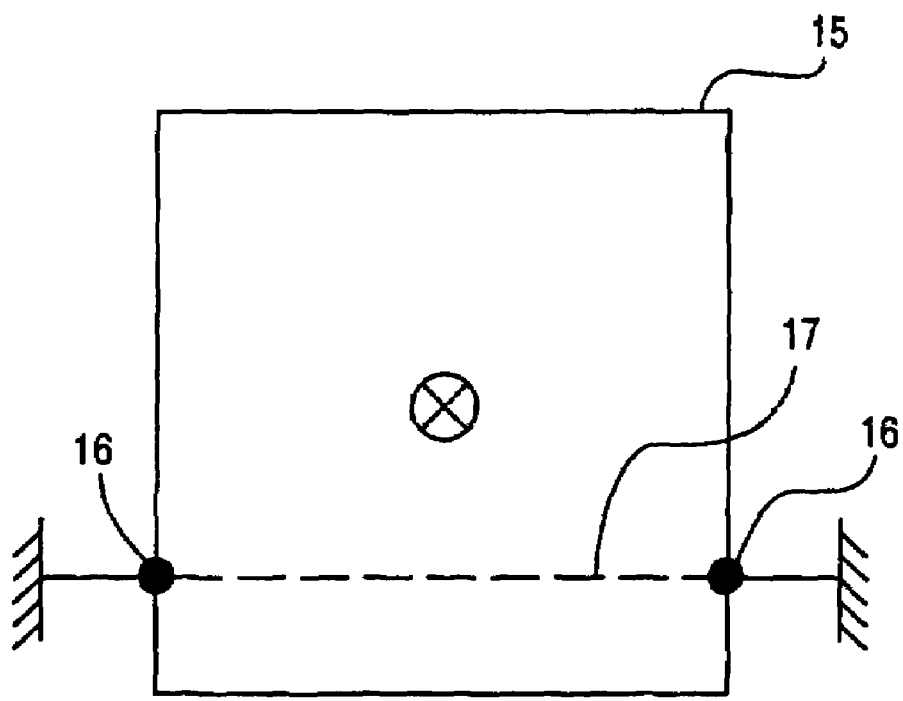
FIG. 6 shows the support arrangement of a movable electrode of a pair of electrodes of the acceleration sensor, according to the present invention.

FIG. 6 shows the support structure of a movable electrode of a pair of electrodes of the acceleration sensor according to the present invention. In the support structure, the movable electrode is supported close to the edge by torsion springs.

Figure 7:
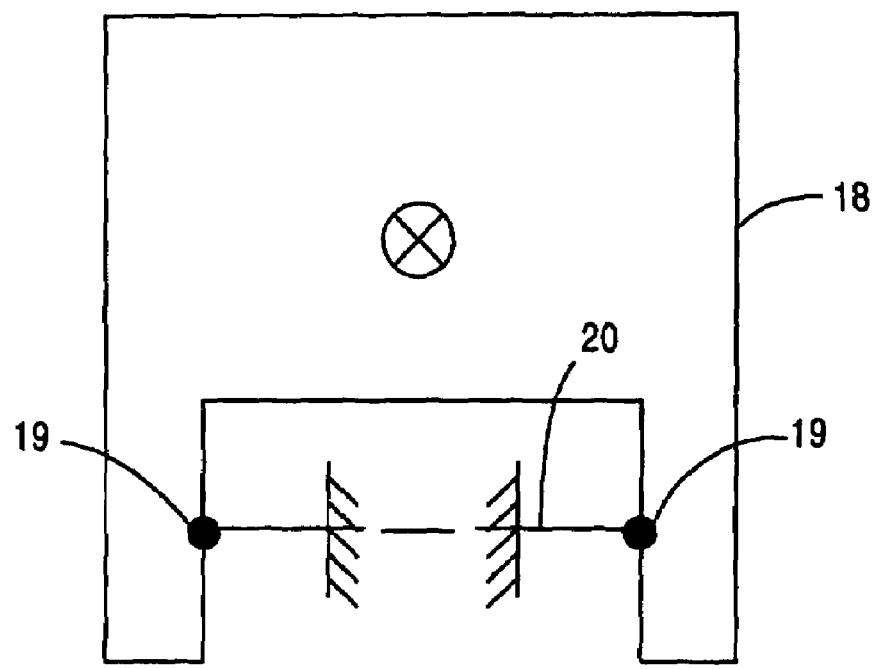
FIG. 7 shows an alternative support arrangement of the movable electrode of a pair of electrodes of the acceleration sensor, according to the present invention.

FIG. 7 shows the support arrangement of the movable electrode of a pair of electrodes of an alternative acceleration sensor according to the present invention. In the support structure, the movable electrode is supported at separate projections by torsion springs.

Figure 8:
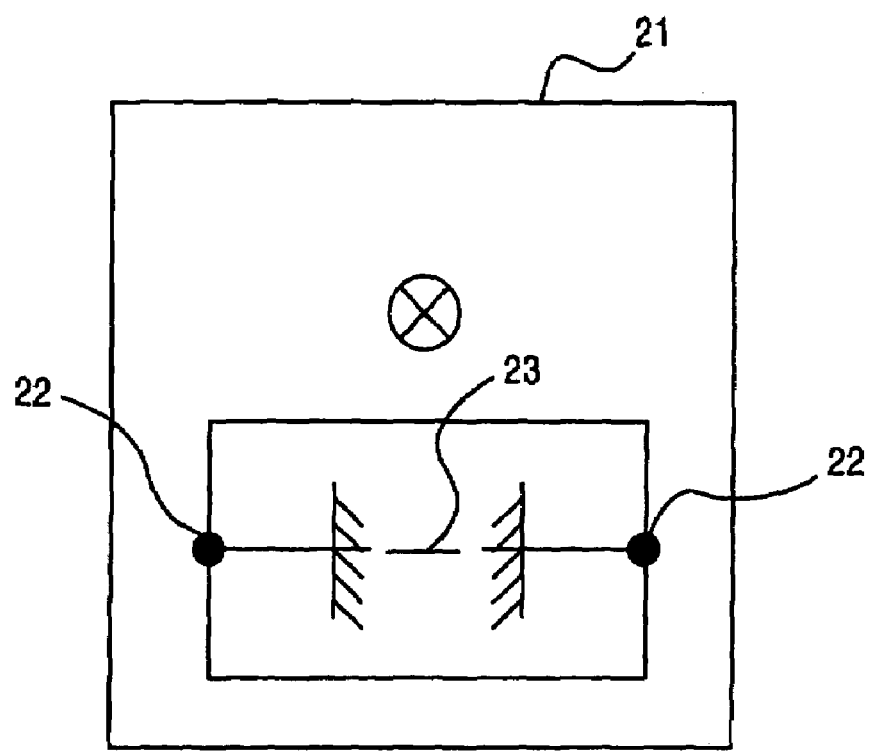
FIG. 8 shows a second alternative support arrangement of the movable electrode of a pair of electrodes of the acceleration sensor, according to the present invention.

FIG. 8 shows the support arrangement of the movable electrode of a pair of electrodes of a second alternative acceleration sensor according to the present invention. In the support structure, the movable electrode is supported at its interior by torsion springs.

Figure 9:
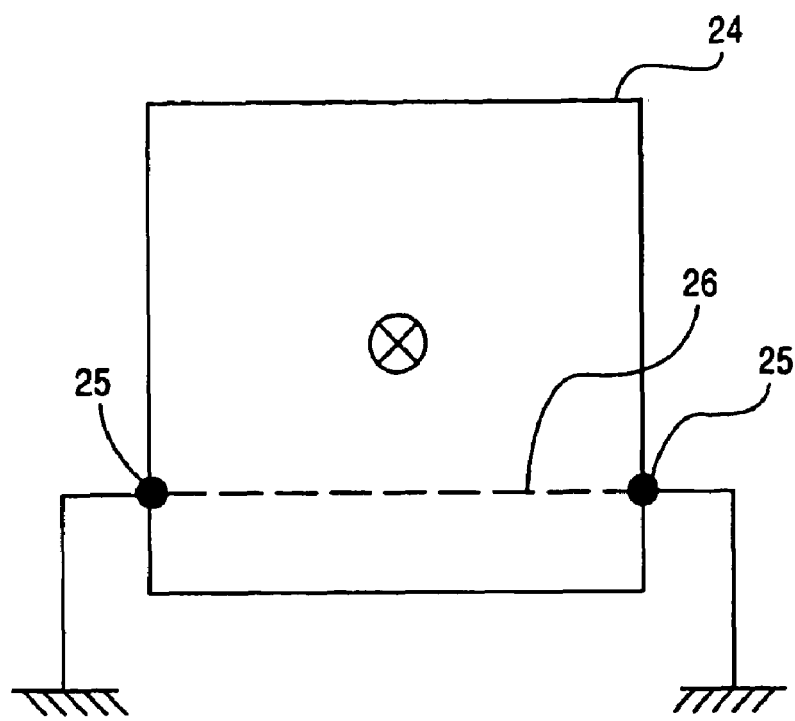
FIG. 9 shows a third alternative support arrangement of the movable electrode of a pair of electrodes of the acceleration sensor, according to the present invention.

FIG. 9 shows the support arrangement of the movable electrode of a pair of electrodes of a third alternative acceleration sensor according to the present invention. In the support structure, the movable electrode is supported by torsion springs having bending and rotational degrees of freedom of equal order of magnitude. The rotational degree of freedom of the support of the movable electrode, however, exists about the straight line determined by the support points of the movable electrode.

Figure 10:
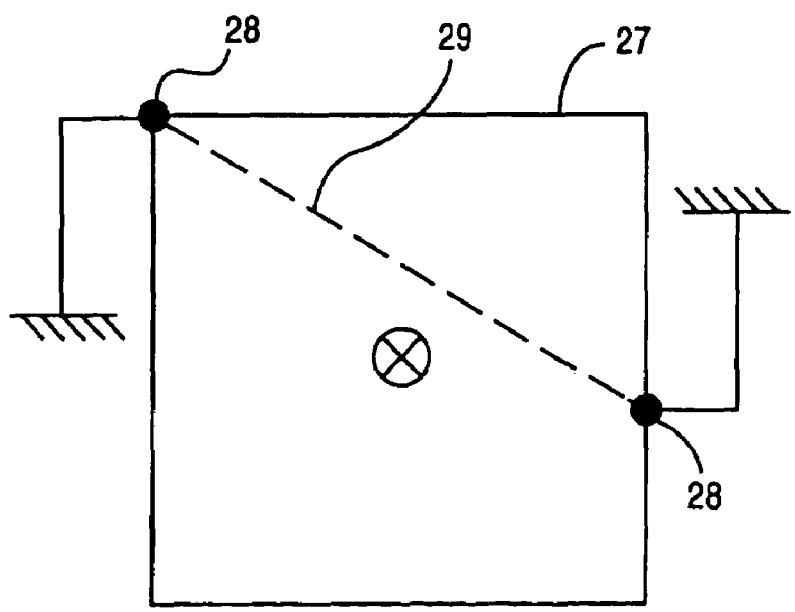
FIG. 10 shows a fourth alternative support arrangement of the movable electrode of a pair of electrodes of the acceleration sensor, according to the present invention.

FIG. 10 shows the support arrangement of the movable electrode of a pair of electrodes of a fourth alternative acceleration sensor according to the present invention. The support arrangement is an asymmetrical arrangement, wherein the movable electrode has a rotational degree of freedom about the straight line determined by the support points.

Figure 11:
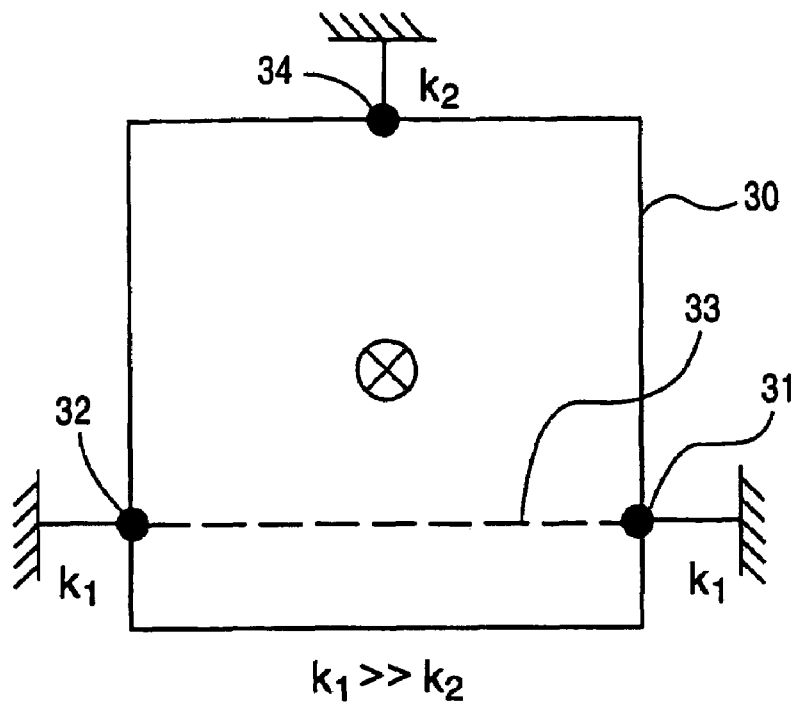
FIG. 11 shows a fifth alternative support arrangement of the movable electrode of a pair of electrodes of the acceleration sensor, according to the present invention.

FIG. 11 shows the support arrangement of the movable electrode of a pair of electrodes of a fifth alternative acceleration sensor according to the present invention. In the support structure, the movable electrode has three support points, two of which are essential support points, due to significantly stiffer springs.

In the acceleration sensor according to the present invention the pair of electrodes is shaped such, that the capacitance change of the movable electrode in rotational motion is enhanced. In the acceleration sensor according to the present invention, when moving in the direction of the positive direction vector of the movable electrode, starting at the straight line connecting the support points of the movable electrode, the active dimension perpendicular to the positive direction vector of the pair of electrodes significantly increases. Here, the positive direction vector of the movable electrode is a vector, the direction of which, drawn to the mid point of a straight line drawn between the essential support points of the movable electrode, is perpendicular to the straight line between the support points, and extends in the electrode plane towards the center of gravity of the movable electrode.

Figure 12:
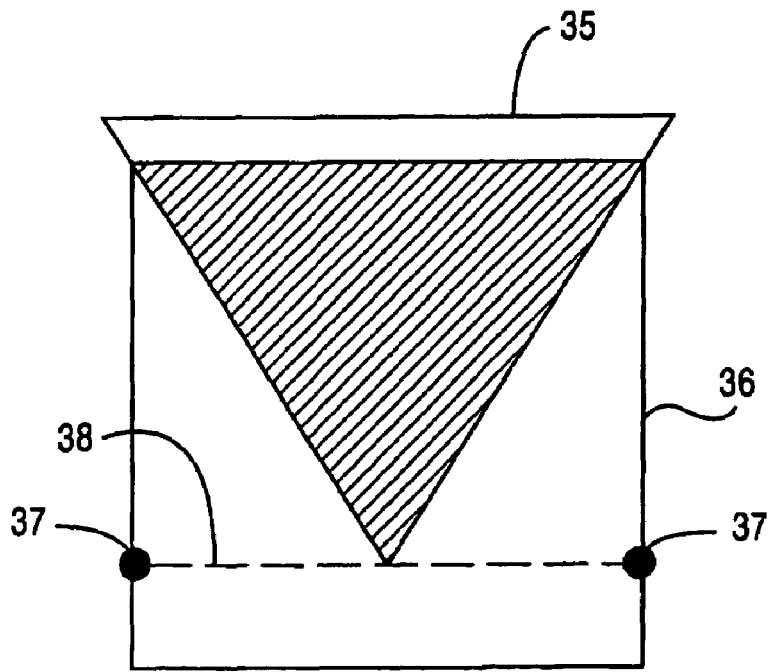
FIG. 12 shows the shape of a movable electrode of a pair of electrodes of the acceleration sensor according to the present invention.

FIG. 12 shows the shape of a movable electrode of a pair of electrodes of the acceleration sensor according to the present invention. The Figure shows a movable electrode, the support points of the movable electrode, and the stationary plating. The pair of electrodes formed by the movable electrode and the stationary plating is depicted striped. The thickness of the movable electrode of the pair of electrodes is very nearly zero at the straight line connecting the support points of the movable electrode, and the active dimension of the electrode increases essentially going in the direction of the positive direction vector of the movable electrode.

Figure 13:
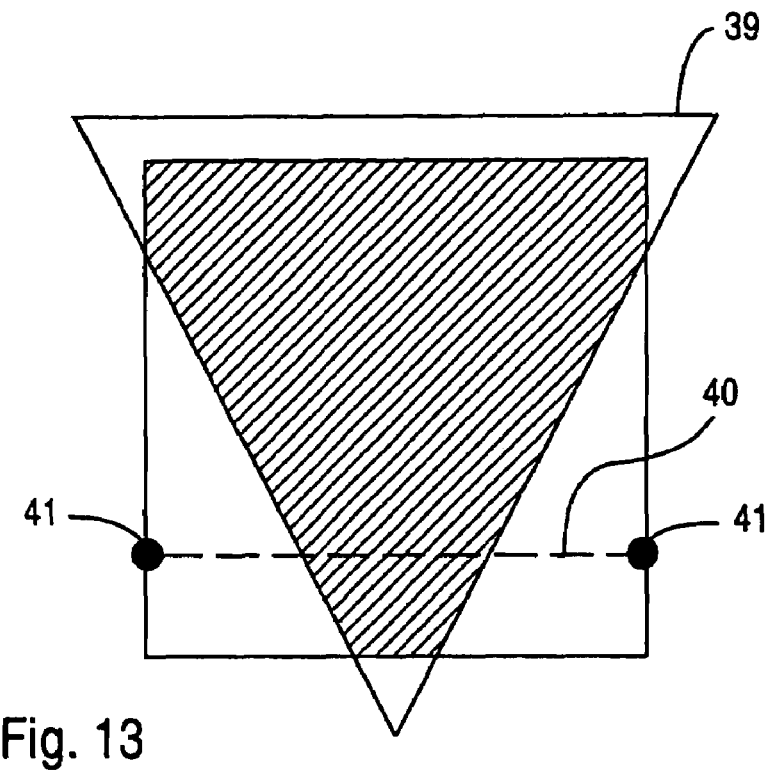
FIG. 13 shows the shape of an alternative movable electrode of a pair of electrodes of the acceleration sensor according to the present invention.

FIG. 13 shows the shape of an alternative movable electrode of a pair of electrodes of the acceleration sensor according to the present invention. The movable electrode of the pair of electrodes has a certain thickness at the straight line connecting the support points of the movable electrode, and the active dimension of the electrode increases essentially going in the direction of the positive direction vector of the movable electrode.

Figure 14:
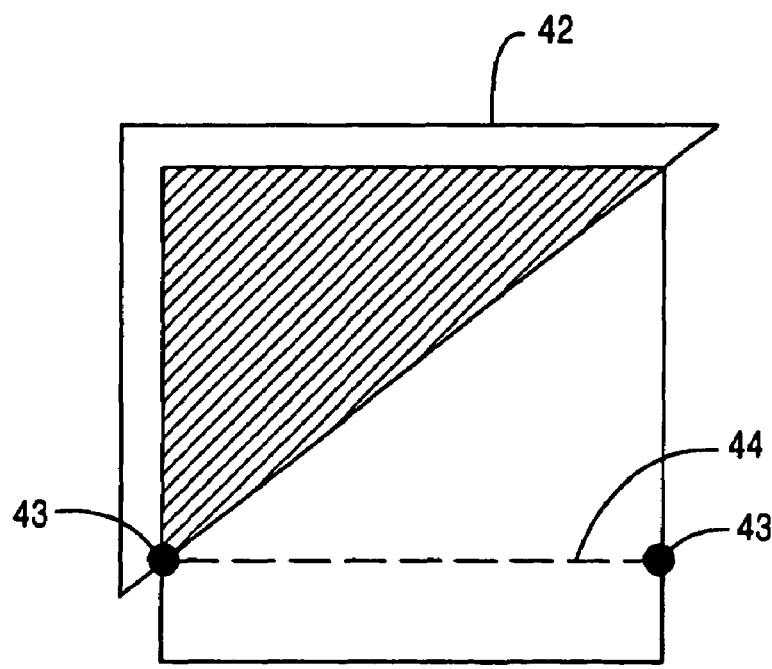
FIG. 14 shows the shape of a second alternative movable electrode of a pair of electrodes of the acceleration sensor according to the present invention.

FIG. 14 shows the shape of a second alternative movable electrode of a pair of electrodes of the acceleration sensor according to the present invention. At the straight line connecting the support points of the movable electrode one side of the movable electrode of the electrode is emphasized, and the active dimension of the electrode increases essentially going in the direction of the positive direction vector of the movable electrode.

Figure 15:
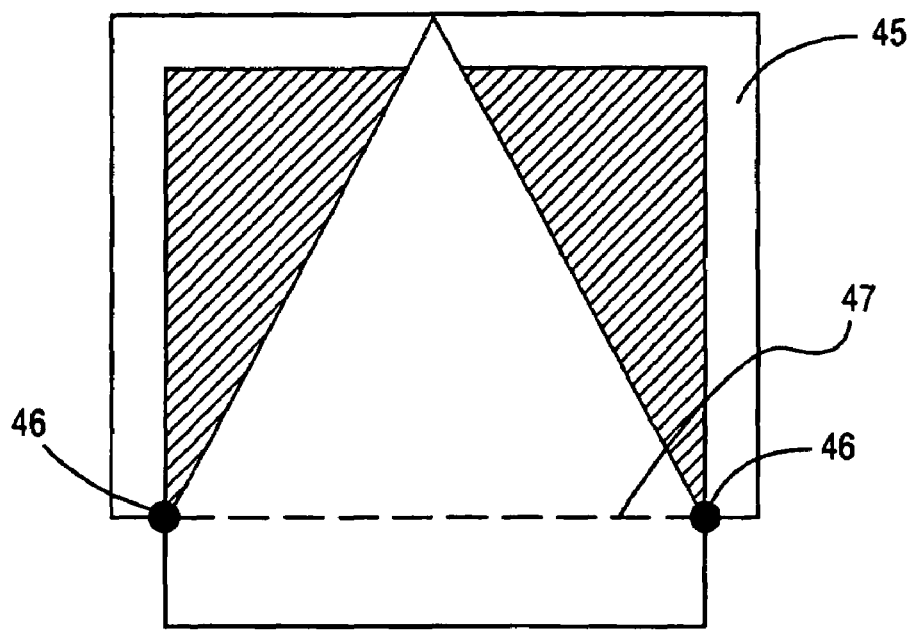
FIG. 15 shows the shape of a third alternative movable electrode of a pair of electrodes of the acceleration sensor according to the present invention.

FIG. 15 shows the shape of a third alternative movable electrode of a pair of electrodes of the acceleration sensor, according to the present invention. The edges of the movable electrode of the electrode are emphasized at the straight line connecting the support points of the movable electrode, and the active dimension of the electrode increases essentially going in the direction of the positive direction vector of the movable electrode.

Figure 16:
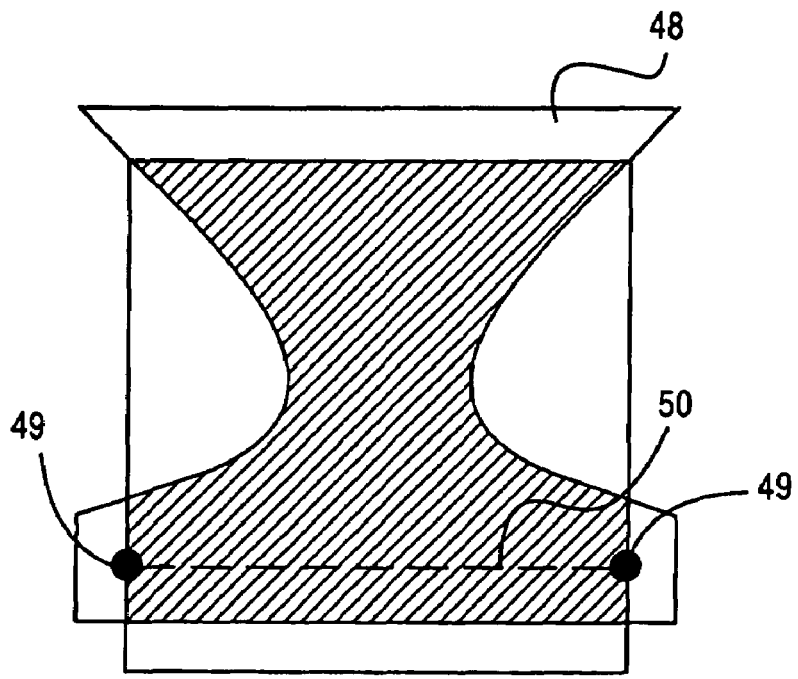
FIG. 16 shows the shape of a fourth alternative movable electrode of a pair of electrodes of the acceleration sensor according to the present invention.

FIG. 16 shows the shape of a fourth alternative movable electrode of a pair of electrodes of the acceleration sensor according to the present invention. The movable electrode of the electrode is specially shaped such, that the active dimension of the electrode first diminishes, followed by an essential increase in the dimension, going in the direction of the positive direction vector of the movable electrode.

Figure 17:
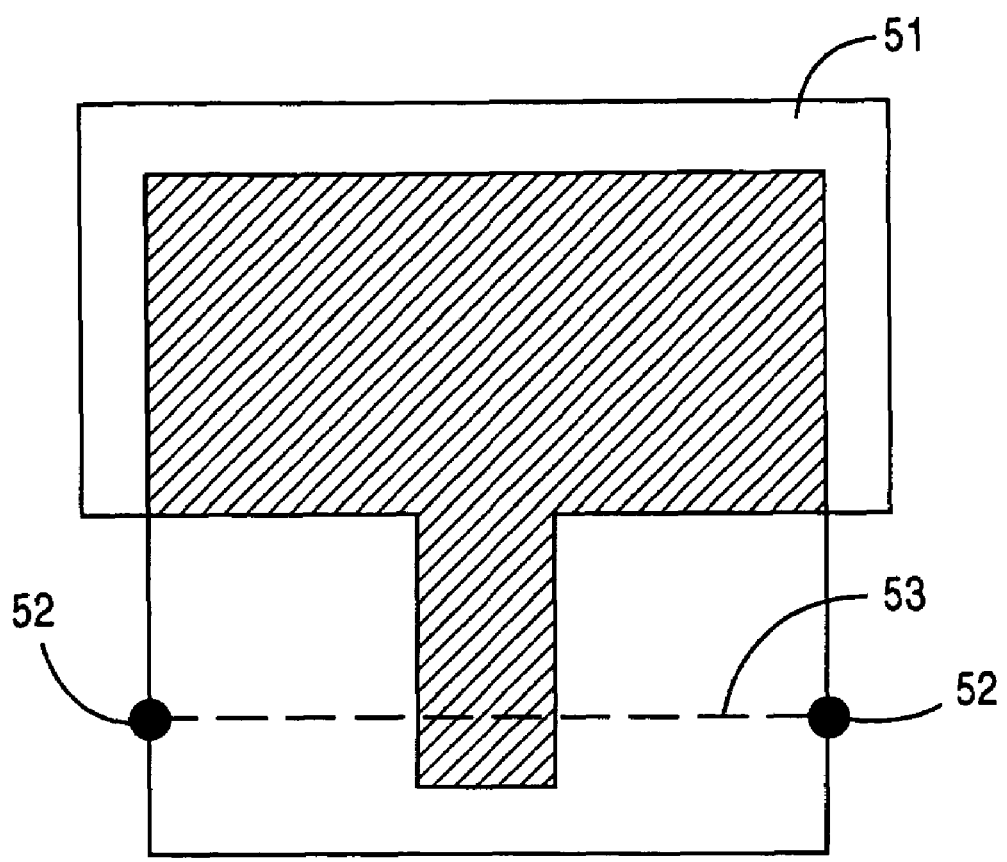
FIG. 17 shows the shape of a fifth alternative movable electrode of a pair of electrodes of the acceleration sensor according to the present invention.

FIG. 17 shows the shape of a fifth alternative movable electrode of a pair of electrodes of the acceleration sensor according to the present invention. The movable electrode of the electrode is specially shaped such, that the active dimension of the electrode first remains constant, followed by a discontinuous, but essential, increase in the dimension, going in the direction of the positive direction vector of the movable electrode.

Figure 19:
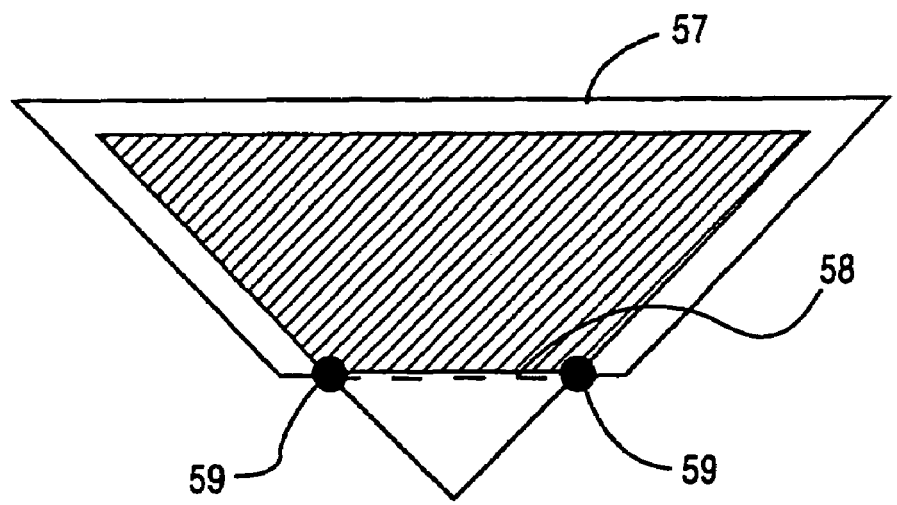
FIG. 19 shows the shape of a sixth alternative movable electrode of a pair of electrodes of the acceleration sensor according to the present invention.

FIG. 19 shows the shape of a sixth alternative movable electrode of a pair of electrodes of the acceleration sensor according to the present invention. The movable electrode of the pair of electrodes starts out at a certain thickness at the straight line connecting the support points of the movable electrode, and the active dimension of the electrode increases evenly and essentially, going in the direction of the positive direction vector of the movable electrode.

The active dimension of the pair of electrodes designates the size, perpendicular to the positive direction vector, at which a significant portion of the capacitance is generated. Thus the active dimension of the pair of electrodes also increase, when the physical dimension of the movable electrode does not increase, but the capacitance of the pair of electrodes increases going in the direction of the positive direction vector.

Figure 20:
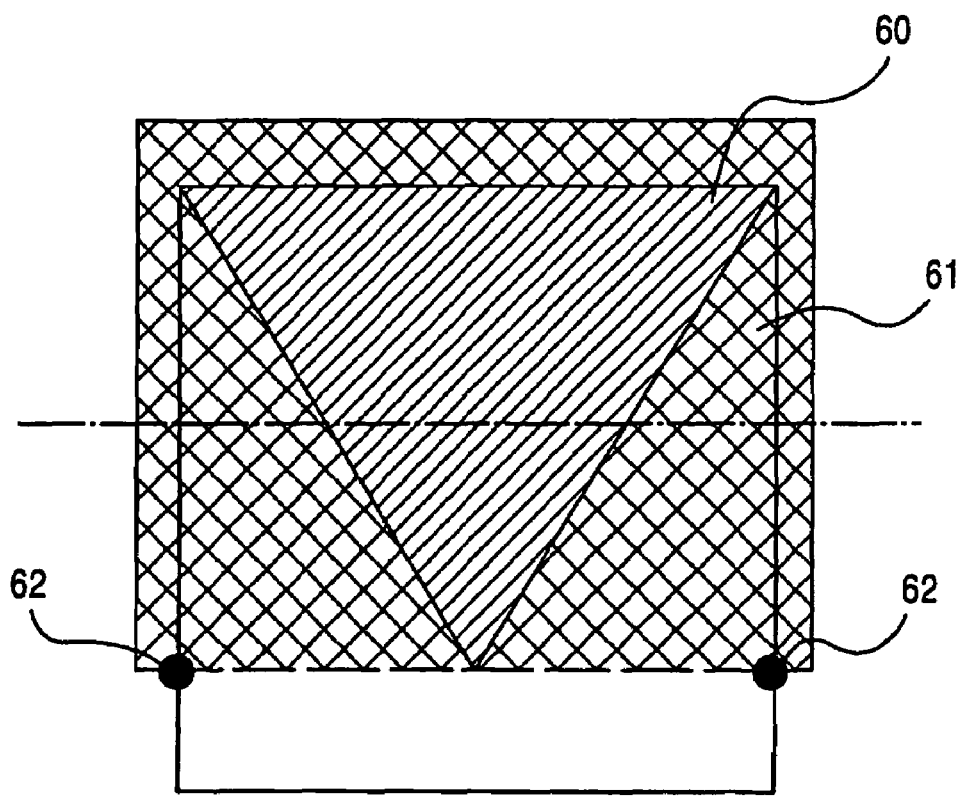
FIG. 20 shows the shape of the electrode according to an alternative implementation of a pair of electrodes of the acceleration sensor according to the present invention.

FIG. 20 shows the shape of an alternative implementation of the electrode of a pair of electrodes of the acceleration sensor, according to an of the invention. The physical dimension of both pairs of electrodes is constant, but the capacitance of a pair of electrodes increases, for example, due to the plating or a larger gap between the electrodes. The striped areas depict the area of the pair of electrodes. The area ruled with squares depicts the active capacitance forming area.

Figure 21:
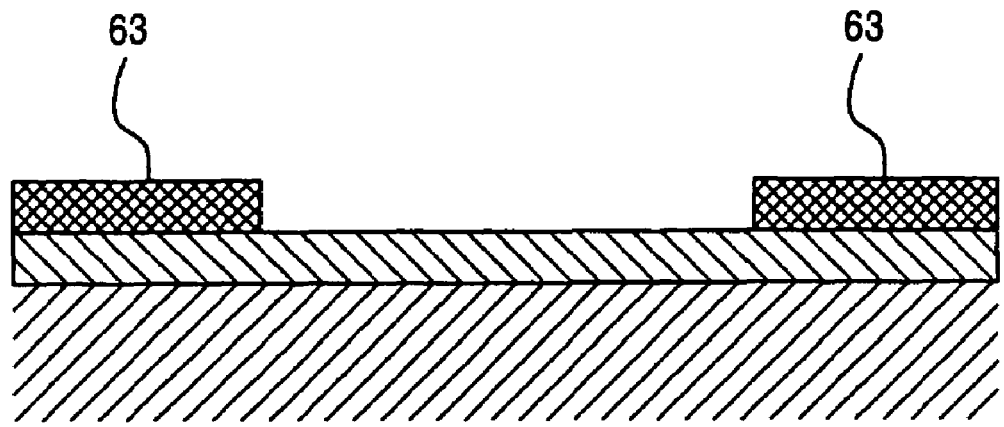
FIG. 21 shows a section through the electrode according to an alternative implementation of a pair of electrodes of the acceleration sensor according to the present invention.

FIG. 21 shows a section according to the alternative implementation, through an electrode of the pair of electrodes of the acceleration sensor according to the present invention. The surface of the square shaped electrode of a pair of electrodes of the acceleration sensor, according to the present invention, is coated with a coating having a very low permittance, whereby the capacitance generated by the coated portion is very small.

Figure 22:
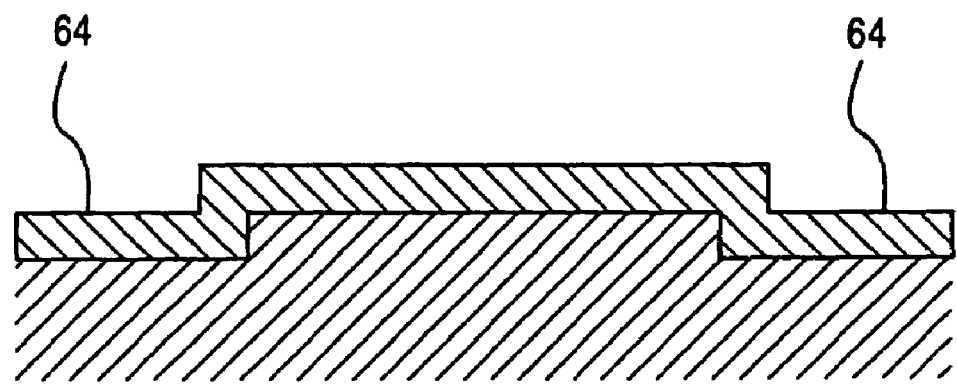
FIG. 22 shows an alternative section through the electrode according to an alternative implementation of a pair of electrodes of the acceleration sensor according to the present invention, The FIGS. 1-2 are presented above. Below, the present invention and preferable methods for its implementation are described with reference to the FIGS. 3-22.

FIG. 22 shows an alternative section according to an alternative implementation through an electrode of a pair of electrodes of the acceleration sensor according to the present invention. The distance of the electrodes in the pair of electrodes of the acceleration sensor according to the present invention varies, whereby the portion having a smaller distance between the electrodes generates significantly more capacitance.

The acceleration sensor structure, according to the present invention, may also comprise a second stationary electrode on the opposite side of each movable electrode.

The acceleration sensor structure, according to the present invention, enables improvement of the capacitance sensitivity of a pair of electrodes based on rotational motion, and acceleration measuring with good performance, in capacitive acceleration sensor designs.

The invention claimed is:

1. A capacitive acceleration sensor comprising at least one pair of electrodes such, that each pair of electrodes comprises a movable electrode, which is responsive to the acceleration, and at least one stationary plate portion, wherein each pair of electrodes further comprises an axis of rotation essentially forming a common axis such, that the movable electrode of the acceleration sensor is rigidly supported at the axis of rotation such, that the movable electrode is free to turn in a rotational motion about the axis of rotation, and that a capacitance change between the movable electrode in rotational motion and the plate portion is enhanced by means of the electrodes, wherein the capacitance change between the movable electrode in rotational motion and the plate portion is enhanced by means of the shape of the electrodes, wherein the pair of electrodes is shaped in the shape of a triangle.

2. A capacitive acceleration sensor comprising at least one pair of electrodes such, that each pair of electrodes comprises a movable electrode, which is responsive to the acceleration, and at least one stationary plate portion, wherein each pair of electrodes further comprises an axis of rotation essentially forming a common axis such, that the movable electrode of the acceleration sensor is rigidly supported at the axis of rotation such, that the movable electrode is free to turn in a rotational motion about the axis of rotation, and that a capacitance change between the movable electrode in rotational motion and the plate portion is enhanced by means of the electrodes, wherein the capacitance change between the movable electrode in rotational motion and the plate portion is enhanced by means of the shape of the electrodes, wherein the pair of electrodes is shaped in the shape of a drop.

3. A capacitive acceleration sensor comprising at least one pair of electrodes such, that each pair of electrodes comprises a movable electrode, which is responsive to the acceleration, and at least one stationary plate portion, wherein each pair of electrodes further comprises an axis of rotation essentially forming a common axis such, that the movable electrode of the acceleration sensor is rigidly supported at the axis of rotation such, that the movable electrode is free to turn in a rotational motion about the axis of rotation, and that a capacitance change between the movable electrode in rotational motion and the plate portion is enhanced by means of the electrodes, wherein the capacitance change between the movable electrode in rotational motion and the plate portion is enhanced by means of the shape of the electrodes, wherein the pair of electrodes is shaped in the shape of a hammer.

* * * * *